United States Patent [19]

Dumaine et al.

[11] Patent Number: 4,995,013
[45] Date of Patent: Feb. 19, 1991

[54] DIRECTIONAL MODULAR LINEAR HYDROPHONIC ANTENNA

[75] Inventors: Bruno Dumaine, La Colle Saint Loup; Gilbert Roman, Saint Paul; Francois Ramoger, Cannes; Guy Bertrand, Nice, all of France

[73] Assignee: Thomson-CSF, Puteaux, France

[21] Appl. No.: 449,769

[22] Filed: Dec. 13, 1989

[30] Foreign Application Priority Data

Dec. 20, 1988 [FR] France .................. 88 16803

[51] Int. Cl.⁵ ................................. G01V 1/38
[52] U.S. Cl. ............................. 367/153; 367/20
[58] Field of Search ............... 181/110, 112; 367/20, 367/106, 130, 153, 154, 173, 178

[56] References Cited

U.S. PATENT DOCUMENTS

| | | | |
|---|---|---|---|
| 2,746,026 | 5/1956 | Comp | 367/162 |
| 3,409,869 | 11/1968 | McCool et al. | 367/162 |
| 4,119,942 | 10/1978 | Merklinger | 367/130 |
| 4,446,544 | 5/1984 | Connolly, Jr. | 367/162 X |
| 4,450,543 | 5/1984 | Neeley | 367/154 |
| 4,731,763 | 3/1988 | Wagner | 367/153 |
| 4,733,379 | 3/1988 | Lopetina et al. | 367/20 |
| 4,762,208 | 8/1988 | Reynier et al. | 367/154 |
| 4,789,968 | 12/1988 | Rice | 367/20 |
| 4,800,542 | 1/1989 | Franklin et al. | 367/154 |

FOREIGN PATENT DOCUMENTS 0264323 4/1988 European Pat. Off. .
3316850 12/1983 Fed. Rep. of Germany .

Primary Examiner—Brian S. Steinberger
Attorney, Agent, or Firm—Oblon, Spivak, McClelland, Maier & Neustadt

[57] ABSTRACT

The disclosure concerns a directional hydrophonic antenna, consisting of several pairs of dipoles formed by omnidirectional hydrophones superimposed in a streamer and keeping the same reference angle for all the pairs of dipoles. The goal sought is achieved by means of a chain of superimposed, directional modules each bearing a hydrophonic sensor on each lateral face and joined by ringed tubular elements through which there goes a central rod made of fiber glass and a strand of electrical connection cables.

8 Claims, 2 Drawing Sheets

DIRECTIONAL MODULAR LINEAR HYDROPHONIC ANTENNA

BACKGROUND OF THE INVENTION

1. Field of the Invention

The field of the invention is that of hydrophonic antennas, more particularly those designed for the detection of targets.

2. Description of the Prior Art

It is well known that the directivity of an linear antenna consisting of omnidirectional hydrophones is omnidirectional in the plane perpendicular to the axis of the antenna. In particular, it is not possible to determine whether a target is located to the right or to the left of the antenna.

However, it is possible to obtain a directivity by designing an antenna with two orthogonal dipoles. As shown in FIG. 2, if D is the distance between the two sensors 22, 23 and 25, 26 of each dipole 21 and 24, the function of directivity is $$2 \sin\left(\frac{\pi D}{\lambda} \sin\theta\right)$$

for one of the dipoles and $$2 \sin\left(\frac{\pi D}{\lambda} \cos\theta\right)$$

for the other dipole, $\theta$ representing the direction. If the wavelength is not far greater than D, then we find the direction by tg$\theta$.

It is advantageous to make an antenna comprising at least one directional module working on this principle.

Now, should it be desired to be able to obtain a horizontal and/or vertical directivity, for example, it is necessary to have several aligned hydrophones with combined signals. In this case, we come up against the difficulty of the adjusting of the directional modules with respect to one another.

There is a seismic exploration system, described in the U.S. Pat. No. 4,789,968 which can be towed by a ship and enables the selective detection of waves coming from a particular direction which is such that the angle of incidence and the amplitude of the detected waves can be determined. This device has hydrophones formed by orthogonal dipoles consisting of semi-cylindrical elements made of piezo-electrical crystal, the hydrophones being arranged along a cylinder. A system such as this can be used to determine the direction of the compression waves and the shearing waves detected by measuring their speed through a field to be analyzed. This device is essentially designed to make probes in a field, but it is not suited to the detection of sound waves coming from a submerged target.

SUMMARY OF THE INVENTION

The invention concerns a hydrophonic antenna which is particularly suited to the detection of submerged targets, comprising at least one directional module making it possible to determine the direction of the sources of waves picked up, this direction being obtained by using hydrophonic sensors placed on a support and measuring gradients of pressure. In this case, it is necessary to get rid of the stray signals arising out of the vibration of the support under the force of the acoustic pressures.

According to the invention, there is proposed a linear hydrophonic antenna of the type formed by a plurality of omnidirectional hydrophonic sensors comprising at least one directional module antenna wherein two pairs of hydrophonic sensors form two orthogonal dipoles, said module being associated with means for identifying the direction of the sources of waves picked up, wherein the hydrophonic sensors are surface sensors of pressure placed on a support by means of an interface made of a visco-elastic material.

Advantageously, each module has four surface pressure sensors made of PVDF, mounted on a support made of syntactic foam and coated in an over-molding of polyurethane.

The invention also concerns a hydrophonic antenna comprising a set of hydrophonic modules all having the same angle reference, for use as a streamer. In this case, it is indeed necessary to restrict the rotation of the streamer around its axis (for example ±2°). At the same time, a constant pitch must be preserved between hydrophones to ensure the formation of directional channels while, at the same time, keeping the antenna flexible to permit its winding, and rigid for navigation. Furthermore, a passage has to be made from one module to the other, for the electrical wiring.

According to another particular characteristic of the invention, the joint between directional modules is formed by a ringed tube crossed by a strand of electrical cables with a central rod.

BRIEF DESCRIPTION OF THE DRAWINGS

Other characteristics and advantages of the invention shall appear in the appended drawings, wherein.

DESCRIPTION OF A PREFERRED EMBODIMENT

Figure 1A:
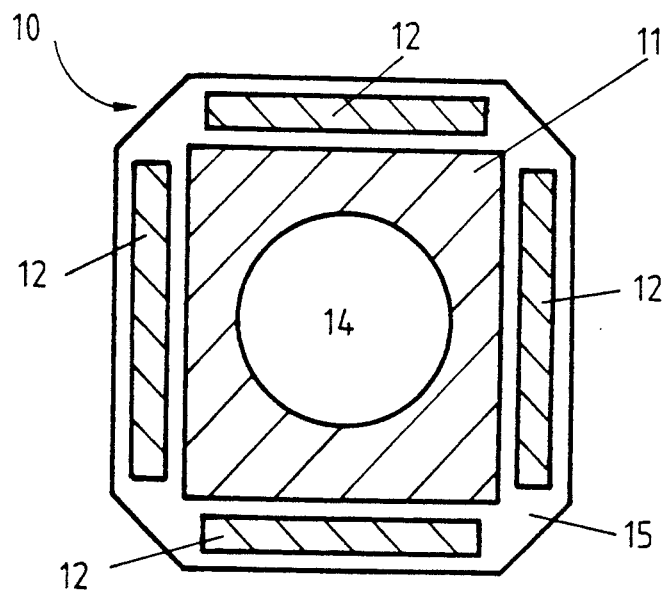
FIG. 1a is a cross-sectional view of the module of FIG. 1.
Figure 1:
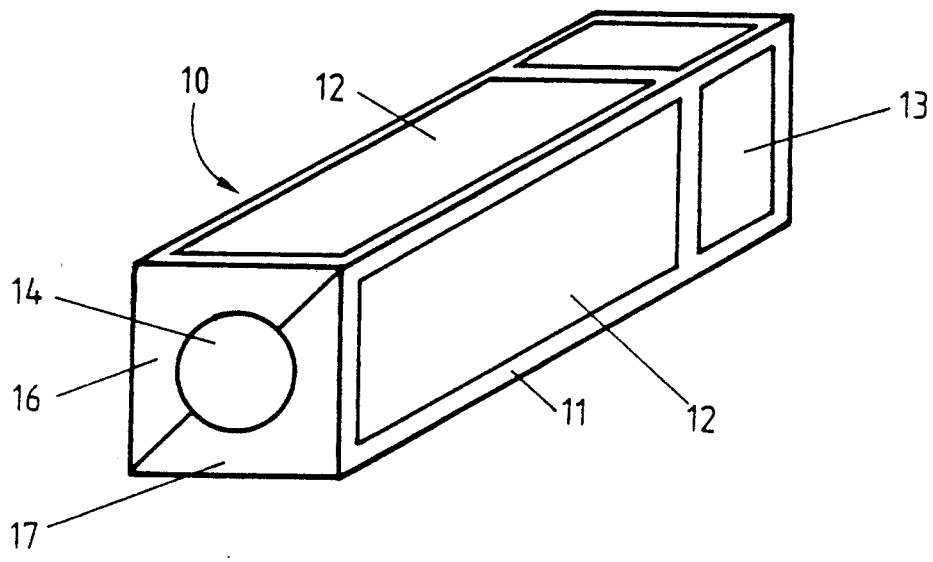
FIG. 1 shows a schematic view in perspective of a directional module for hydrophonic antennas according to the invention.
Figure 2:
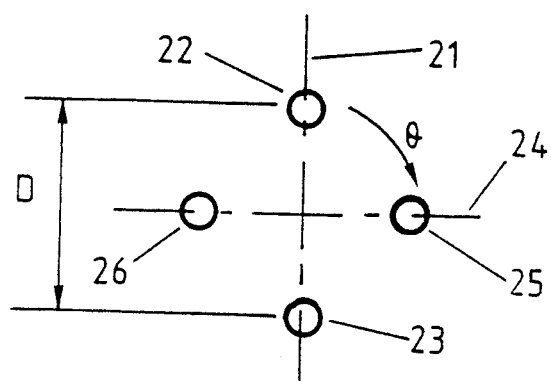
FIG. 2 illustrates the principle of use of the two orthogonal dipoles for reading the direction of a source of waves picked up.

As shown in FIG. 1, each hydrophonic module 10 is formed by a support 11, advantageously having a square-sectioned parallellepiped shape, made of a rigid material that is transparent to sound waves (namely, a material having a density/speed product close to that of water). This material, which should be capable of being easily machined, advantageously consists of a syntactic foam.

Four "bistrip" surface sensors 12, made of piezoelectric polymer, are placed on the four lateral faces of the support. The thickness of these surface sensors 12 advantageously does not exceed 2 to 3 mm.

Figure 3:
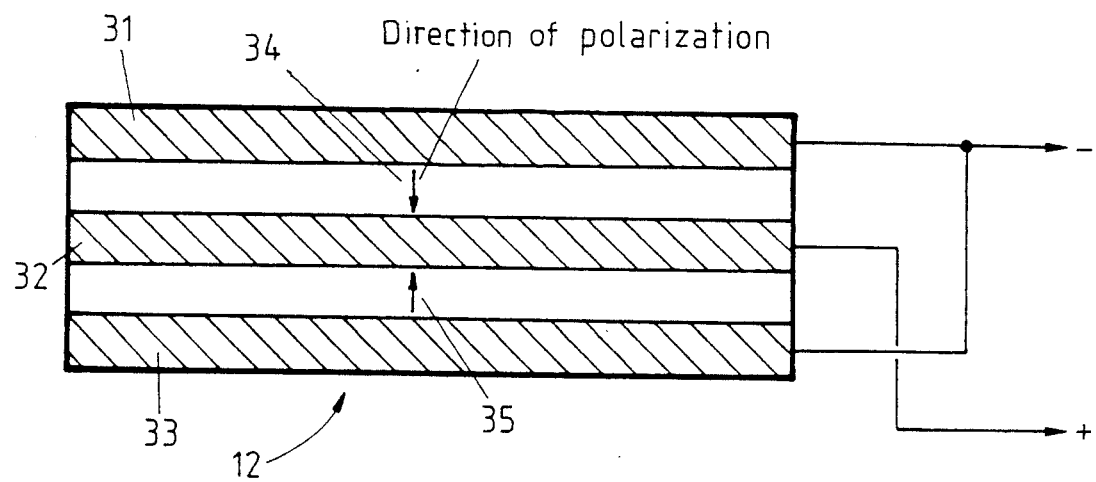
FIG. 3 gives a schematic view of a mode of polarization of a bistrip surface sensor used in an antenna module of the invention.

As shown in FIG. 3, each sensor advantageously consists of three metallic electrodes 31, 32, 33 polarized in the directions indicated by the arrows 34, 35. The electrodes are separated by PVDF (polyvinylidene fluoride).

A housing 13 is reserved for the electronic circuitry. The support 11 is hollowed out at the center (FIG. 1a) to enable the connections to pass through and to provide for the holding of the intermodule joints 41.

When the surface sensors 12 are placed directly on the support 11, stray signals, coming from the deformation of the support which vibrates under the force of the acoustic pressures, disturb the working of the sensors 12. To get rid of these stray signals, the surface sensors are insulated from the support 11 by an interface 15 made of a visco-elastic material, for example polyurethane, which advantageously also forms an over-molding of the entire unit.

Figure 4:
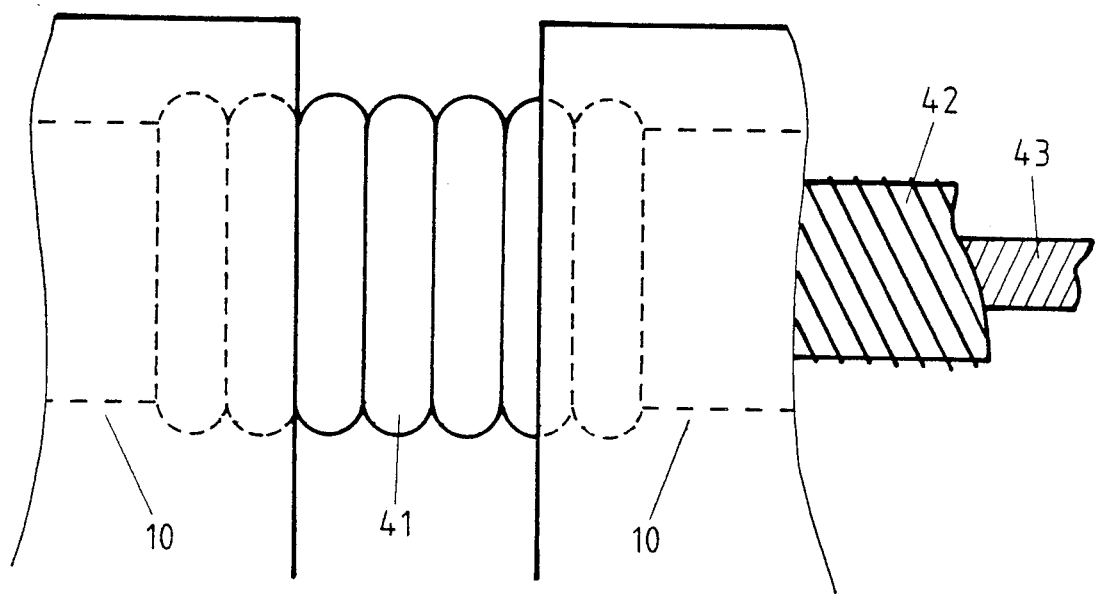
FIG. 4 gives a schematic view of the element for connecting two directional modules of the antenna of the invention.

As shown in FIG. 4, the joint between modules 10 is preferably made by means of a ringed tubular element 41, made of a plastic material highly resistant to torsion. The strand 42 of electrical connection cables has a central rod 43 made of carbon fiber or fiber glass which provides rigidity against deflection and extends throughout the length of the antenna. A rod 43 of this kind ensures that there will be no undulation of the antenna during navigation.

The support 10 is advantageously made in two substantially symmetrical longitudinal parts, the central hollow 14 being grooved at each end designed to be connected to another module so as to bond the rings of the joint 41 thereto. Thus, high tensile strength is obtained.

The "chain" of modules thus made is advantageously placed in a sheath filled with insulating oil as is known in passive streamers.

By way of an example, an antenna such as this, having 32 modules spaced out at 112 mm, has been made. This antenna works in a frequency band located around 3.5 kHz. The intermodule torsion observed was been restricted to a maximum of ±2°.

The invention is not restricted to the exemplary embodiments that have been precisely described. Notably, the support 11 may have a geometry different from that of a parallelepiped, for example a cylindrical or other geometry, provided that the material made of piezoelectric polymer is shaped to the geometry used.

What is claimed is:

1. A linear hydrophonic antenna formed by a plurality of omnidirectional hydrophonic sensors comprising at least one directional module antenna wherein two pairs of hydrophonic sensors form two orthogonal dipoles, said modules being associated with means for identifying a direction of sources of waves picked up, wherein the hydrophonic sensors are surface pressure sensors placed on a support by means of an interface made of a visco-elastic material, wherein said support is a parallelepiped-shaped support having lateral faces and bearing a hydrophonic sensor on each of said lateral faces.

2. An antenna according to claim 1, wherein the surface pressure sensors are bistrips made of PVDF.

3. An antenna according to claim 1, wherein the parallelepiped support is coated with syntactic foam.

4. An antenna according to any of the claims 1, 2 and 3, wherein the module is coated with a polyurethane overmolding.

5. An antenna according to claim 1, having at least two superimposed directional modules, comprising means for connecting the modules, formed by a ringed tubular element with high resistance to torsion, fixedly joined to the support of each of the adjacent modules.

6. An antenna according to claim 5, wherein a strand of electric cables for the connection of the modules goes through the tubular element.

7. An antenna according to claim 5 wherein, a central rod for the rigidification, under deflection, of the link goes through the tubular element, said central rod being made of a material being at least one of carbon fiber and fiber glass.

8. An antenna according to claim 5, wherein said parallelepiped-shaped support is formed by two bonded, substantially symmetrical, longitudinal parts, provided externally with grooves for receiving the connecting tubular element on at least one of their ends.

* * * * *